(12) United States Patent
Paivio et al.

(10) Patent No.: US 12,698,049 B2
(45) Date of Patent: Aug. 4, 2026

(54) MULTI-ANGLE ADJUSTABLE BICYCLE SIDE DECK

(71) Applicant: Mobility Holdings, Ltd., Hong Kong (HK)

(72) Inventors: Pasi Paivio, Hong Kong (HK); Joakim Uimonen, Hong Kong (HK)

(73) Assignee: Mobility Holdings, Ltd., Hong Kong (HK)

( * ) Notice: Subject to any disclaimer, the term of this patent is extended or adjusted under 35 U.S.C. 154(b) by 272 days.

(21) Appl. No.: 18/500,160

(22) Filed: Nov. 2, 2023

(65) Prior Publication Data

US 2025/0145239 A1 May 8, 2025

(51) Int. Cl.
*B62J 7/02* (2006.01)

(52) U.S. Cl.
CPC ........................................ *B62J 7/02* (2013.01)

(58) Field of Classification Search
CPC .............. B62J 9/23; B62J 7/04; A47B 57/045
USPC ....... 224/432, 429, 430, 444, 452, 453, 553, 224/502–509, 282; 211/150; 108/6
See application file for complete search history.

(56) References Cited

U.S. PATENT DOCUMENTS 1,900,438 A * 3/1933 Erickson ................... B60R 9/06
224/511
3,151,576 A * 10/1964 Patterson .............. A47F 5/0087
248/242

3,934,770 A * 1/1976 Larsen ....................... B62J 9/23
224/434
5,117,986 A * 6/1992 Lin ......................... A47B 57/20
108/2
5,125,517 A * 6/1992 Martinell ................. B62H 3/12
211/90.03
7,025,236 B1 * 4/2006 Naujock ................... B62J 9/23
224/413
8,857,686 B1 * 10/2014 Vitanza ...................... B62J 7/04
224/454
11,299,226 B2 * 4/2022 Uimonen ................... B62J 9/23
11,801,909 B2 * 10/2023 Ledingham .............. B62J 25/04

* cited by examiner

*Primary Examiner* — Corey N Skurdal
(74) *Attorney, Agent, or Firm* — Cooper Legal Group LLC

(57) ABSTRACT

A multi-angle adjustable bicycle side deck including a bracket system, side deck, and locking apparatus is provided. The bracket system is mounted to a rear side frame of a bicycle. The side deck is rotatably assembled to the bracket system and folds down from a vertical adjusted position to a horizontal adjusted position, and zero or more additional adjusted positions in between. The bracket system includes at least one rear bracket and at least one front bracket, both including predominantly vertical portions which are parallel to each other. At least one rear bracket includes a structural support housing, structurally supporting the locking apparatus when in operation. The side deck is locked to the bracket system in each of the adjusted position via a spring quick release lock pin of the locking apparatus and a plurality of locking holes of a main deck of the side deck.

20 Claims, 14 Drawing Sheets

Fig. 10

MULTI-ANGLE ADJUSTABLE BICYCLE SIDE DECK

TECHNICAL FIELD

The present disclosure is related to the field of bicycle load transport in general and more particularly but not limited to multi-angle adjustable bicycle side decks.

BACKGROUND OF THE INVENTION

Cargo bicycles are sturdy bikes which are designed to carry cargo and/or passengers. Often, cargo bicycles have a longer wheelbase than standard bicycles, with a space for carrying the cargo or passengers either in the front or back. Generally, cargo bicycles carrying cargo or passengers in the back include a rear carrier rack and are sometimes referred to as longtail bikes. Accessories can be integrated with or attached to longtail bikes for customizing specific carrying needs, including passenger bike seats, child bike seats, side decks, cages, boxes, and canopies.

In order to transport passengers or cargo, a cargo bicycle may come with an integrally formed side deck, sometimes known as running board, side board, or footrest. The side deck allows a support base for passengers to rest their feet on. When carrying cargo, the side deck may be used to support the cargo or passengers. However, when not transporting passengers or cargo, the integrally formed side deck adds width to the cargo bicycle that may prevent or restrict the ability to ride through narrow spaces. When riding through a narrow space, the horizontal side decks may scrape against walls or other objects, causing increased risk of accident or injury. When riding in traffic, horizontal side decks increase the proximity to cars, increasing the risk of a collision. Moreover, because the width of the side decks is fixed, when transporting cargo that is narrower than the width of the side decks, the load of the cargo may be distributed partially out on the deck away from the bicycle and the bicyclist, resulting in a less balanced bicycle and increased risks. Furthermore, ropes, straps or fasteners may be required to secure the cargo to the side decks, increasing set-up time for transportation, and adding accessories which must be carried and may be lost or stolen. While some side decks may be removed and remounted to the bicycle, such removal and remounting increases set-up time for transportation of passengers or cargo and increases the possibility of lost or damaged parts.

SUMMARY OF THE INVENTION

The present disclosure provides a multi-angle adjustable bicycle side deck including a bracket system, a side deck, and a locking apparatus. The multi-angle adjustable bicycle side deck includes an adjustable width load of the bicycle and side deck that may be locked in place at different adjusted positions having different angles without the use of ropes, straps or fasteners.

In at least one embodiment, a multi-angle adjustable bicycle side deck includes a bracket system, a side deck, and a locking apparatus. The bracket system is configured for mounting to a rear side frame of a bicycle. The side deck is rotatably assembled to the bracket system, whereby the side deck folds down from a vertical adjusted position to a horizontal adjusted position, and zero or more additional adjusted positions in between the vertical and horizontal adjusted positions. Width loads of the side deck get progressively larger as the side deck is moved from the vertical to the horizontal adjusted positions. The locking apparatus locks the side deck to the bracket system in each of the adjusted positions, including the vertical and horizontal adjusted positions. Each width load is defined by a plane of the rear side frame of the bicycle and a top surface plane of the side deck.

In at least one embodiment, the bracket system includes at least one rear bracket and at least one front bracket. The at least one rear bracket includes a predominantly vertical portion of the bracket system located on one rear side frame of the bicycle near the rear of the rear wheel of the bicycle. The at least one front bracket includes a predominantly vertical portion of the bracket system located on the same rear side frame of the bicycle near the front of the rear wheel of the bicycle. Each of the predominantly vertical portions is attached to both the bicycle and the side deck. In at least one embodiment, the predominantly vertical portions of the bracket system are parallel to each other.

In at least one embodiment, the at least one rear bracket includes a structural support housing protruding from a lower portion of the predominantly vertical portion. The structural support housing structurally supports the locking apparatus when the side deck is locked to the bracket system.

In at least one embodiment, at least one of the predominantly vertical portions of the bracket system further includes an adjustment member protruding through the predominantly vertical portion. The adjustment member abuts the at least one attachment end when the side deck is in the horizontal adjusted position.

In at least one embodiment, at least one of the at least one attachment end includes a semi-circular portion and the locking apparatus includes a spring quick release lock pin. The at least one of the at least one attachment ends includes a plurality of locking holes. The spring quick release lock pin protrudes through the structural support housing to lock the side deck to the bracket system.

In at least one embodiment, the side deck is removable and replaceable by alternate side decks of different dimensions. Each side deck is interchangeably rotatably assembled to the bracket system.

In at least one embodiment, a pair of panniers is mounted on opposite sides of the bicycle, whereby each of the panniers is supported by one multi-angle adjustable bicycle side deck. Each of the panniers includes an accordion-like folding system, whereby when the side deck is adjusted to the horizontal adjusted position the pannier is full expanded and when the side deck is adjusted to the vertical adjusted position the pannier is squeezed between the bicycle and the side deck. When each of the panniers is squeezed between the bicycle and the side deck a storage volume of the pannier decreases.

In at least one embodiment, the side deck further includes at least one attachment end, whereby each at least one attachment end is fastened to the bracket system using any combination of nuts, bolts, screws, rivets or fasteners. In at least one embodiment, the mounting of the bracket system to the rear side frame of the bicycle includes at least one of a screw, a weld, a rivet, a bolt, or a fastener, or any combination of the foregoing.

In at least one embodiment, the side deck is made of at least one of tubes, sheet metal, and plates, or any combination of the foregoing.

In at least one embodiment, a bicycle includes the multi-angle adjustable bicycle side deck. The multi-angle adjustable bicycle side deck includes a bracket system, a side deck, and a locking apparatus. The bracket system is configured for mounting to a rear side frame of a bicycle. The side deck is rotatably assembled to the bracket system, whereby the side deck folds down from a vertical adjusted position to a horizontal adjusted position, and zero or more additional adjusted positions in between the vertical and horizontal adjusted positions. Width loads of the side deck get progressively larger as the side deck is moved from the vertical to the horizontal adjusted positions. The locking apparatus locks the side deck to the bracket system in each of the adjusted positions, including the vertical and horizontal adjusted positions. Each width load is defined by a plane of the rear side frame of the bicycle and a top surface plane of the side deck.

In at least one embodiment, the bicycle further includes a pair of rubber dampers mounted to the predominantly vertical portions. When the side deck is in the vertical adjusted position the side deck abuts the pair of rubber dampers.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of multi-angle adjustable bicycle side decks incorporating aspects of the presently disclosed principles are illustrated by way of example, and not by way of limitation.

FIG. 10 is a cross-sectional view of the locking apparatus of FIG. 9A in operation according to one embodiment of the present disclosure.

DETAILED DESCRIPTION

The following describes various principles related to transport of loads on bicycles by way of reference to specific examples of multi-angle adjustable bicycle side decks, including specific arrangements and examples of bracket systems, and the side decks embodying innovative concepts. More particularly, but not exclusively, such innovative principles are described in relation to structural support housings and locking apparatuses and well-known functions or constructions are not described in detail for purposes of succinctness and clarity. Nonetheless, one or more of the disclosed principles can be incorporated in various other embodiments of side decks to achieve any of a variety of desired outcomes, characteristics, and/or performance criteria.

Thus, multi-angle adjustable bicycle side decks having attributes that are different from those specific examples discussed herein can embody one or more of the innovative principles, and can be used in applications not described herein in detail. Accordingly, embodiments of multi-angle adjustable bicycle side decks not described herein in detail also fall within the scope of this disclosure, as will be appreciated by those of ordinary skill in the relevant art following a review of this disclosure.

Example embodiments as disclosed herein are directed to multi-angle adjustable bicycle side decks, whereby a side deck is mounted to a bracket system and the side deck is locked in place by a locking apparatus. The multi-angle adjustable bicycle side deck includes an adjustable width load of the bicycle and side deck that may be locked in place at different adjusted positions having different angles. Strength of the attachment ends of the side deck to the bracket system is enhanced and improved by a rear L-shaped support bracket and a front L-shaped support bracket of the side deck. Strength of the locking apparatus locking the side deck to the bracket system is enhanced and improved by a flat U-shape of the predominantly vertical portions of the bracket system, a structural support housing of one of the predominantly vertical portions, and a reinforced locking portion of a spring quick release lock pin of the locking apparatus.

Figure 1A:
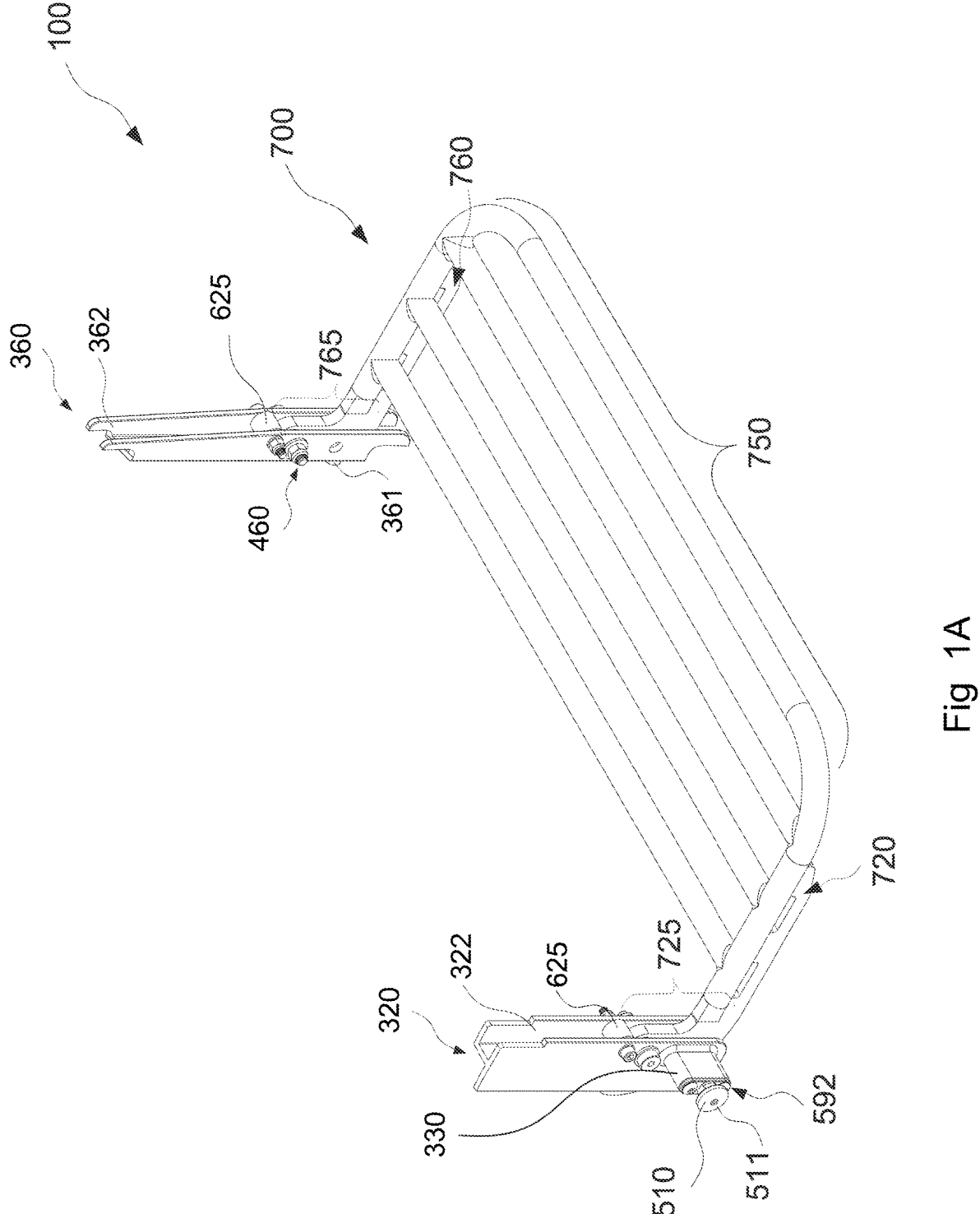
FIG. 1A is a perspective view of a multi-angle adjustable bicycle side deck according to one embodiment of the present disclosure.
Figure 1B:
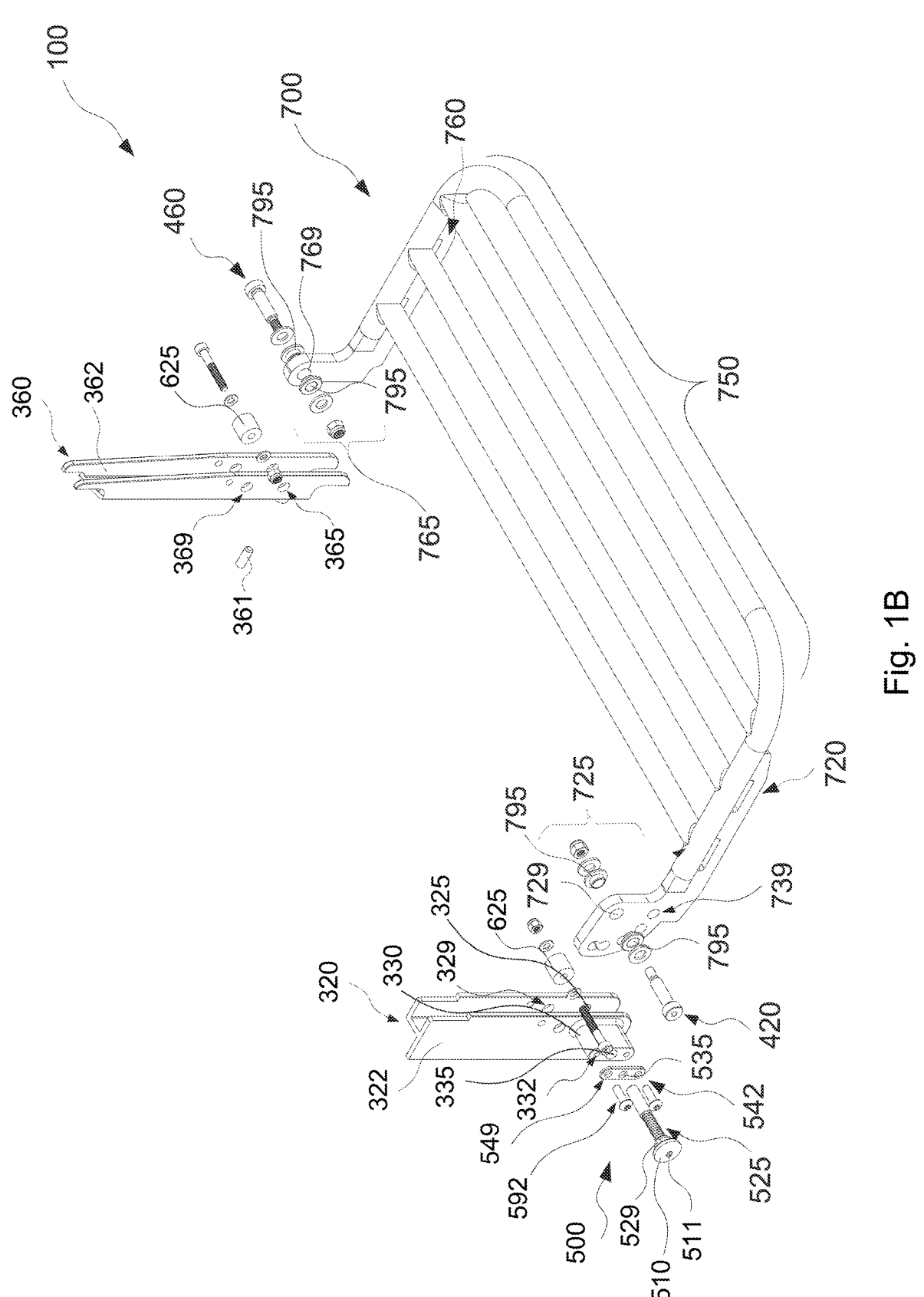
FIG. 1B is an exploded view of the multi-angle adjustable bicycle side deck of FIG. 1A according to one embodiment of the present disclosure.
Figure 2A:
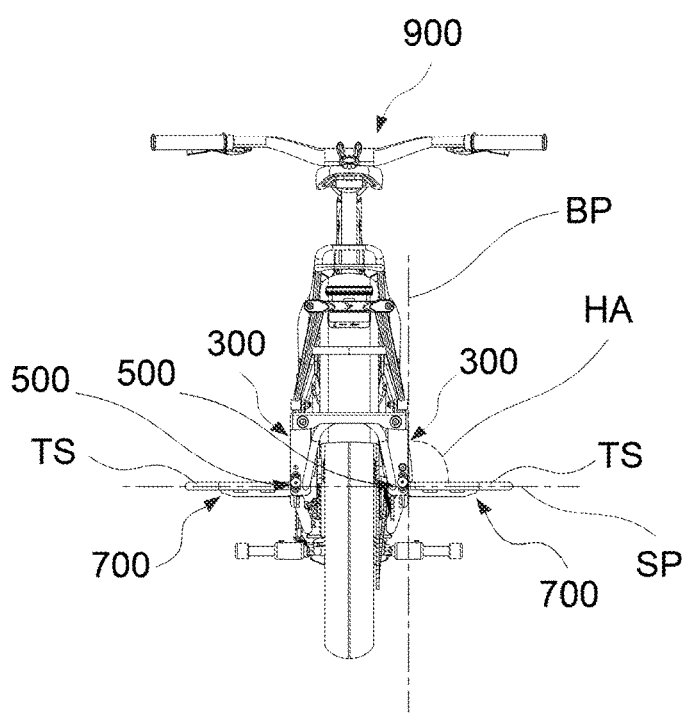
FIG. 2A is a perspective view of the multi-angle adjustable bicycle side deck of FIG. 1A in a horizontal adjusted position mounted to a rear side frame of a bicycle according to one embodiment of the present disclosure.
Figure 2B:
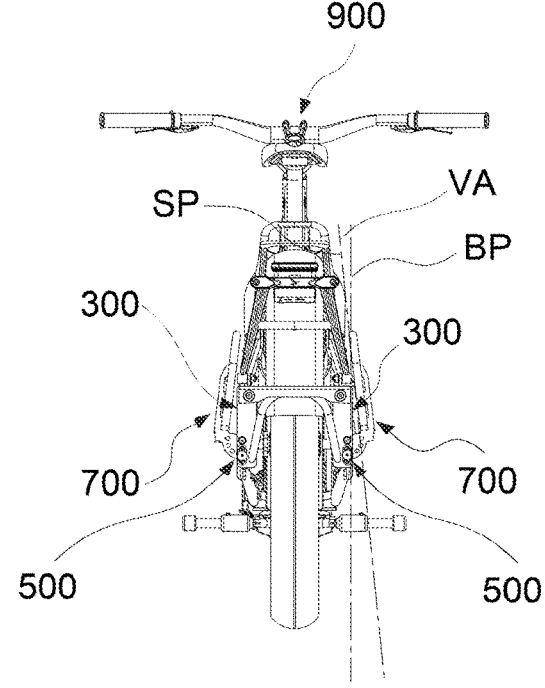
FIG. 2B is a perspective view of the multi-angle adjustable bicycle side deck of FIG. 1A in a vertical adjusted position mounted to a rear side frame of a bicycle according to one embodiment of the present disclosure.
Figure 2C:
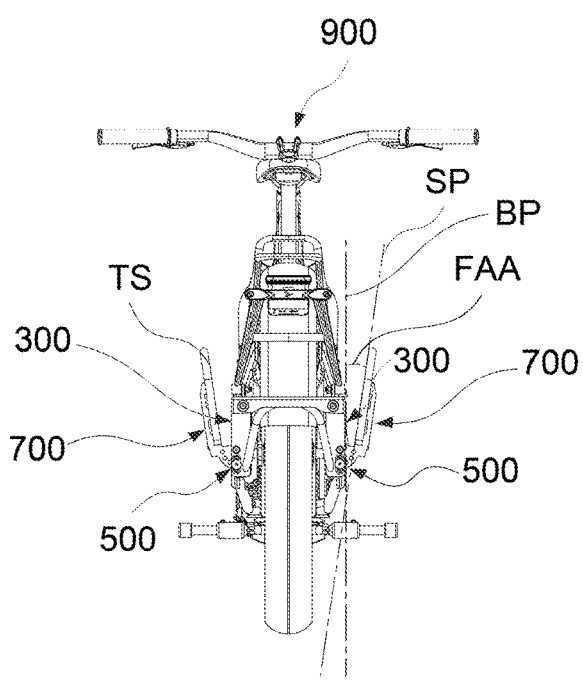
FIG. 2C is a perspective view of the multi-angle adjustable bicycle side deck of FIG. 1A in an additional adjusted position mounted to a rear side frame of a bicycle according to one embodiment of the present disclosure.
Figure 2D:
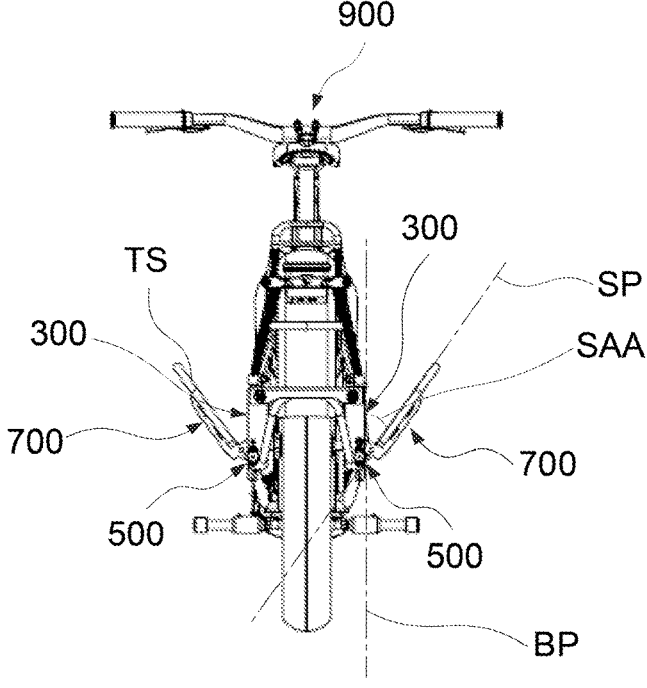
FIG. 2D is a perspective view of the multi-angle adjustable bicycle side deck of FIG. 1A in another additional adjusted position mounted to a rear side frame of a bicycle according to one embodiment of the present disclosure.
Figure 2E:
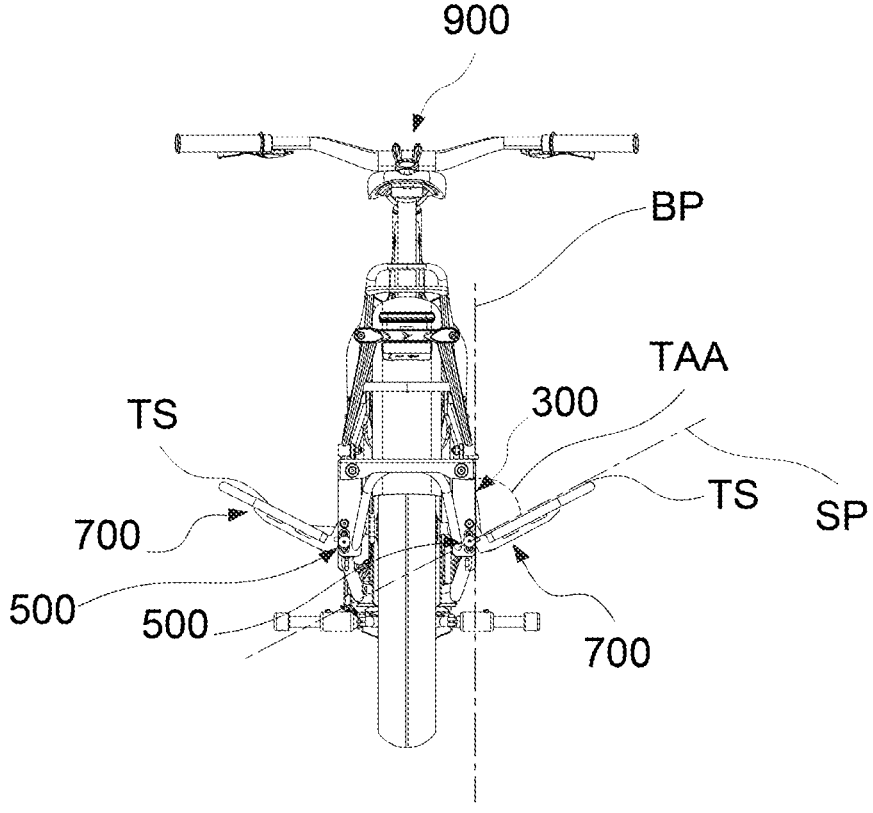
FIG. 2E is a perspective view of the multi-angle adjustable bicycle side deck of FIG. 1A in yet another additional adjusted position mounted to a rear side frame of a bicycle according to one embodiment of the present disclosure.

FIGS. 1A and 1B include at least one embodiment of a multi-angle adjustable bicycle side deck 100. The multi-angle adjustable bicycle side deck 100 includes a bracket system 300, a side deck 700, and a locking apparatus 500. The bracket system 300 is configured for mounting to a rear side frame 920 of a bicycle 900 (shown in FIGS. 2A to 2D).

FIGS. 2A to 2E include at least one embodiment of the adjusted positions of the multi-angle adjustable bicycle side deck 100. The side deck 700 is rotatably mounted to the bracket system 300, whereby the side deck 700 folds down from a vertical adjusted position VA to a horizontal adjusted position HA, and zero or more additional adjusted positions FAA/SAA/TAA in between the vertical VA and horizontal adjusted positions HA. Width loads of the side deck 700 get progressively larger as the side deck 700 is moved from the vertical to the horizontal adjusted positions VA/HA. As an example, an angle of the vertical adjusted position VA can be negative 7 degrees, an angle of the additional adjusted position of FIG. 2C can be 9 degrees, an angle of the another additional adjusted position of FIG. 2D can be 25 degrees, an angle of the yet another additional adjusted position of FIG. 2E can be 57.5 degrees, and an angle of the horizontal adjusted position HA can be 90 degrees. The locking apparatus 500 locks the side deck 700 to the bracket system 300 in each of the adjusted positions, including the vertical VA and horizontal adjusted positions HA. Each width load is defined by a plane BP of the rear side frame 920 of the bicycle 900 and a top surface plane SP of the side deck 700.

The term "width load" in the present context is understood to mean the maximum load that can be carried between the plane BP of the rear side frame 920 of the bicycle 900 and the top surface plane SP of the side deck 700. The term "maximum load" in the present context is understood to include legs and feet of a passenger or passengers and any type of cargo, including such examples as wooden beams, planks, surfboards, plastic or cardboard boxes of different sizes and dimensions, or other objects.

Figure 3:
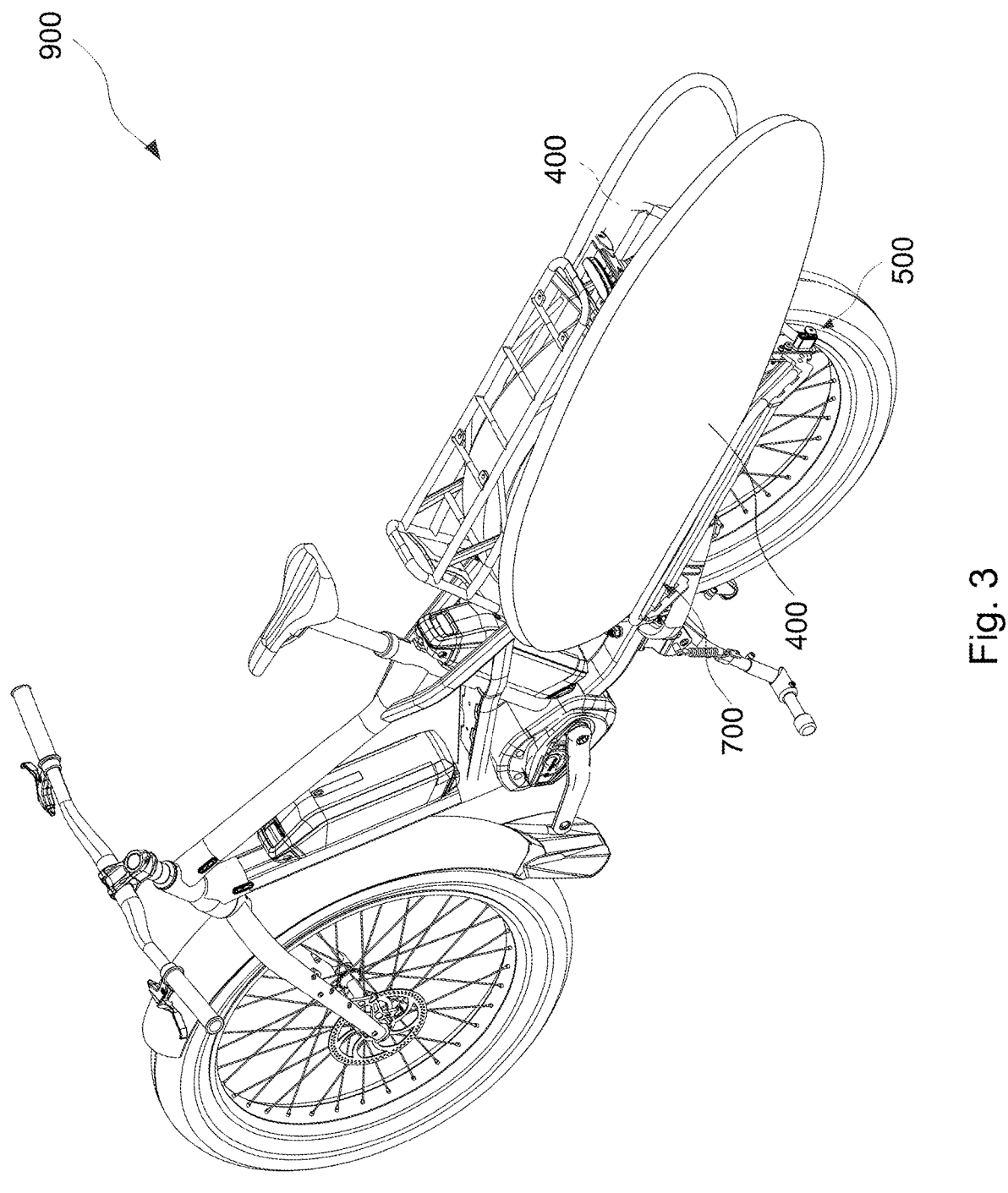
FIG. 3 is a perspective view of the multi-angle adjustable bicycle side deck of FIG. 1A in the additional adjusted position of FIG. 2C carrying cargo according to one embodiment of the present disclosure.

FIG. 3 includes at least one embodiment of the adjusted positions of the multi-angle adjustable bicycle side deck 100 carrying cargo. In the embodiments, the multi-angle adjustable bicycle side deck 100 adjusts a width load of the bicycle 900 and locks the side deck 700 in place at different adjusted positions having different angles. When a maximum width load of the bicycle 900 is less than a maximum width load of the side deck 700 in the horizontal adjusted position HA, one or more passengers or cargo can be securely transported without the use of ropes, straps or fasteners. Furthermore, as the angle of the adjusted positions decrease so does a maximum width of the bicycle 900. Thus, a bicyclist of the bicycle 900 can decrease the maximum width of the bicycle 900 while still securely transporting cargo, so that riding between narrower spaces is possible and riding in traffic is safer. In addition, when cargo is secured between and by the bracket system 300, the locking apparatus 500, and the side deck 700 of the multi-angle adjustable bicycle side deck 100, the cargo load is distributed more centrally toward the center of the bicycle 900 so that the bicycle 900 is more balanced and easier to control by the bicyclist, making transportation safer. If a side deck could only be in a horizontal position while carrying a load that is narrower than the width of the side deck in the horizontal position, a less centrally distributed weight of the cargo would result in a less balanced bicycle 900 which would be more difficult to control by the bicyclist, making transportation less safe.

Figure 4:
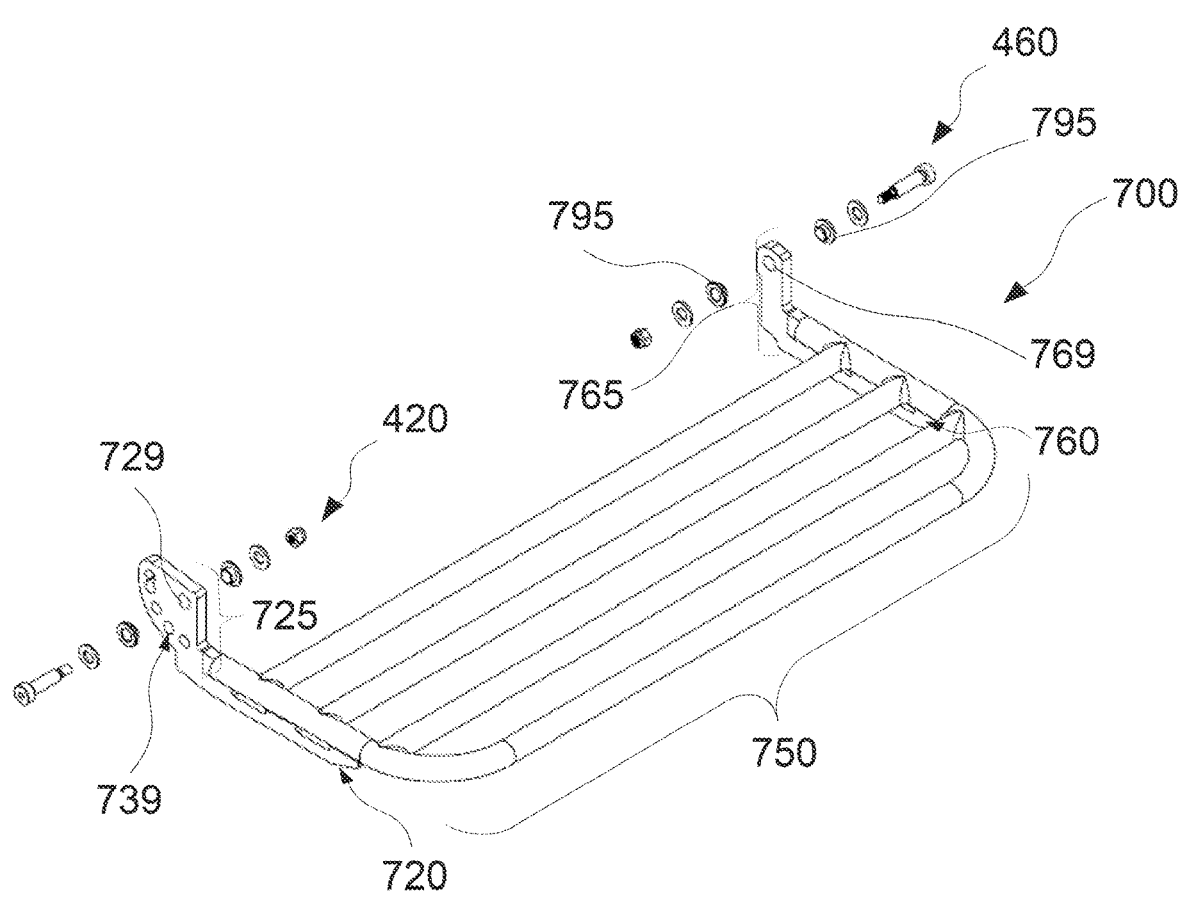
FIG. 4 is a perspective view of a side deck of the multi-angle adjustable bicycle side deck of FIG. 1A according to one embodiment of the present disclosure.

FIG. 4 includes at least one embodiment of a side deck 700 of the multi-angle adjustable bicycle side deck 100. The side deck 700 includes at least one attachment end 725/765. In at least one embodiment, the side deck 700 further includes a main deck 750 and a rear L-shaped support bracket 720 having one attachment end 725 and a front L-shaped support bracket 760 having one attachment end 765. In the embodiments, as an example, the shape of the main deck 750 is rectangular having two same side rounded corners. The rear L-shaped support bracket 720 is disposed below and adjacent to a rectangular corner of the main deck 750, opposite one of the same side rounded corner. The front L-shaped support bracket 720 is disposed below and adjacent to a rectangular corner of the main deck 750, opposite the other same side rounded corner.

In at least one embodiment, the rear L-shaped support bracket 720 and the front L-shaped support bracket 760 are disposed below and adjacent to the rectangular corners of the main deck 750 on edges of the rear L-shaped support bracket 720 and the front L-shaped support bracket 760, respectively. Thus, the rear L-shaped support bracket 720 and the front L-shaped support bracket 760 strengthen and support the main deck 750 when carrying a passenger(s) or cargo. Specifically, bending stiffness, load-bearing capacity, and flexural rigidity at the at least one attachment end 725/765 are increased when a passenger(s) or cargo is carried and the side deck 700 is not in a horizontal adjusted position HA. Thus, the rear L-shaped support bracket 720 and the front L-shaped support bracket 760 prevent the main deck 750 from bending and increase a maximum load that can be carried by the multi-angle adjustable bicycle side deck 100.

Figure 5:
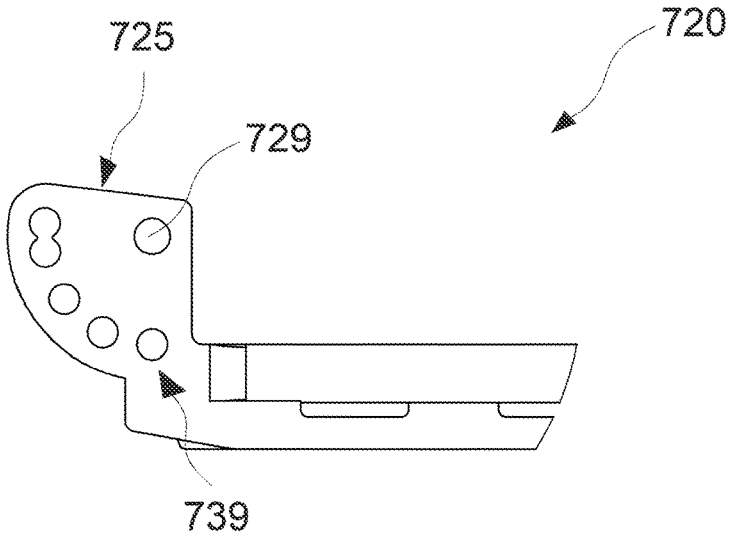
FIG. 5 is a perspective view of a rear L-shaped support bracket of the side deck of the multi-angle adjustable bicycle side deck of FIG. 1A according to one embodiment of the present disclosure.

FIG. 5 includes at least one embodiment of the rear L-shaped support bracket 720 of the side deck 700 of the multi-angle adjustable bicycle side deck 100. In at least one embodiment, the rear attachment end 725 is a "semi-circular portion 725" of the at least one of the at least one attachment end 725/765, and includes a rear mounting hole 729 and a plurality of locking holes 739, and the front attachment end 765 includes a front mounting hole 769. The rear mounting hole 729 corresponds to the front mounting hole 769 for rotation of the side deck 700. The plurality of locking holes 739 form a semi-circular pattern of holes along a perimeter of a curved portion of the rear attachment end 725 (or semi-circular portion 725). The plurality of locking holes 739 correspond to the locking apparatus 500 and the bracket system 300 for locking of the side deck 700 to the bracket system 300 in each of the adjusted positions. In the embodiments, as an example, the number of the plurality of locking holes 739 is five, corresponding to the angle of the vertical adjusted position VA, the angle of the additional adjusted position of FIG. 2C, the angle of the another additional adjusted position of FIG. 2D, the angle of the yet another additional adjusted position of FIG. 2E, and the angle of the horizontal adjusted position HA. In at least one embodiment, the side deck 700 is removable and replaceable by alternate side decks of different dimensions, whereby each side deck 700 is interchangeably rotatably mounted to the bracket system 300. Thus, the number of the plurality of locking holes 739 and corresponding angles of the zero or more additional adjusted positions in between the vertical VA and horizontal adjusted positions HA can be varied depending on the alternate side decks of different dimensions.

In at least one embodiment, the side deck 700 is made of at least one of tubes, sheet metal, and plates, or any combination of the foregoing. In the embodiments, as an example, a material of the side deck 700 can be at least one of metal, metal-alloy, plastic, wood or any combination of the foregoing.

In at least one embodiment, each of the at least one attachment end 725/765 (or the rear attachment end 725 and front attachment end 765), is fastened 460 to the bracket system 300 using any combination of nuts, bolts, screws, rivets or fasteners. The rear attachment end 725 and the front attachment end 765 are mounted to the bracket system 300 via the rear mounting hole 729 and front mounting hole 769, respectively. In the embodiments, as an example, a pair of sliding bearings 795/795 can be attached to each side of the rear mounting hole 729 and front mounting hole 769, respectively, so that play or rattling during operation of the bicycle 900 when the side deck 700 is in the adjusted positions does not occur.

Figure 6:
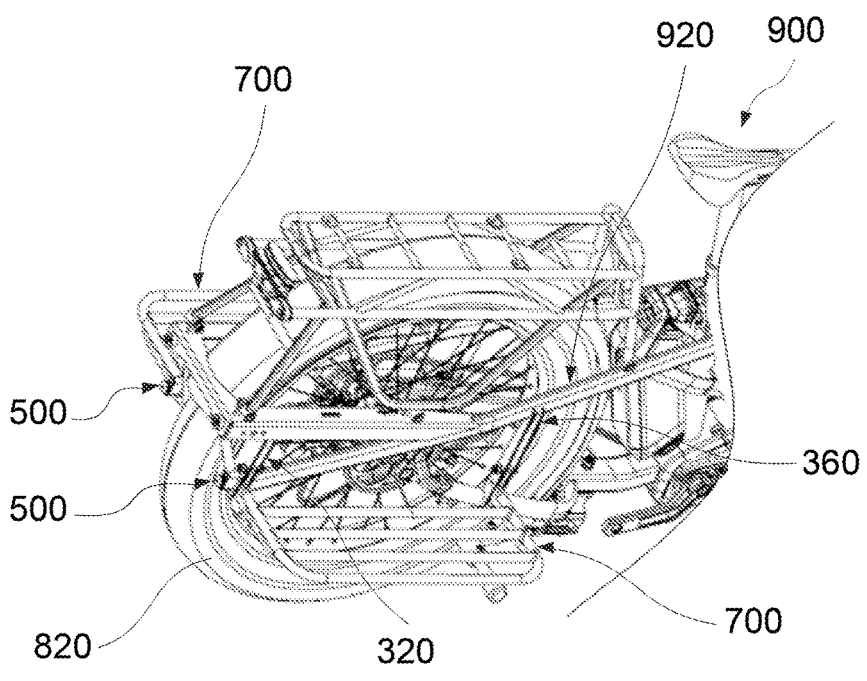
FIG. 6 is a perspective view of a multi-angle adjustable bicycle side deck of FIG. 1A mounted to a bicycle according to one embodiment of the present disclosure.
Figure 7:
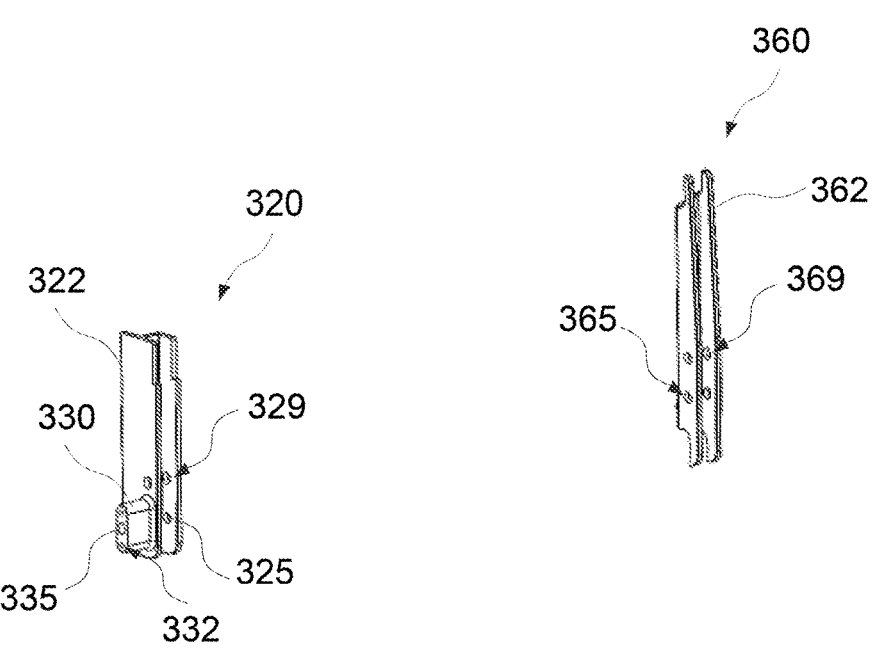
FIG. 7 is a perspective view of predominantly vertical portions of a bracket system of the multi-angle adjustable bicycle side deck of FIG. 1A according to one embodiment of the present disclosure.

FIG. 6 includes at least one embodiment of the multi-angle adjustable bicycle side deck 100 mounted to the bicycle 900 and FIG. 7 includes at least one embodiment of the predominantly vertical portions 322/362 of the bracket system 300. The bracket system 300 includes at least one rear bracket 320 and at least one front bracket 360. The at least one rear bracket 320 includes a predominantly vertical portion 322 of the bracket system 300 located on one rear side frame 920 of the bicycle 900 near a rear of the rear wheel 920 of the bicycle 900. The at least one front bracket 360 includes a predominantly vertical portion 362 of the bracket system 300 located on the same one rear side frame 920 of the bicycle 900 near the front of the rear wheel 920 of the bicycle 900. Each of the predominantly vertical portions 322/362 is attached to both the bicycle 900 and the side deck 700. In at least one embodiment, the predominantly vertical portions 322/362 of the bracket system 300 are parallel to each other.

In at least one embodiment, the predominantly vertical portions 322/362 of the bracket system 300 have a flat U-shape having a base and two plated arms extending from two opposite edges of the base. The vertical length of the at least one rear bracket 320 is less than the vertical length of the at least one front bracket 360. In at least one embodiment, the two plated arms have the same width and the width of the two plated arms is larger than the width of the base so that the rear attachment end 725 (or semi-circular portion 725) and front attachment end 765 can smoothly rotate when the side deck 700 is rotated from the vertical adjusted position VA to the horizontal adjusted position HA. In the embodiments, as an example, a material of the predominantly vertical portions 322/362 of the bracket system 300 can be at least one of metal, metal-alloy, reinforced plastic, or other materials.

In at least one embodiment, the at least one rear bracket 320 includes a structural support housing 330 protruding from a lower portion of the predominantly vertical portion 322. The structural support housing 330 structurally supports the locking apparatus 500 when the side deck 700 is locked to the bracket system 300. In the embodiments, as an example, the structural support housing 330 has a cuboid shape with opposing rounded ends.

In at least one embodiment, the structural support housing 330 protrudes laterally from an outer lower portion of the predominantly vertical portion 322 and further includes a support through hole 335 and a pair of fixing holes 332. The locking apparatus 500 is mounted to the structural support housing 330 via the pair of fixing holes 332. The support through hole 335 is disposed through a center of the structural support housing 330 and an outer arm of the predominantly vertical portion 322 of the at least one rear bracket 320.

In at least one embodiment, the predominantly vertical portion 322 includes a pair of rear attachment holes 329/329 and a support hole 325. The pair of rear attachment holes 329/329 laterally correspond to each other and are disposed above the structural support housing 330. As an example, the distance between the pair of rear attachment holes 329/329 and the structural support housing 300 is not greater than a vertical length of the structural support housing 300. The support hole 325 is disposed through an outer lower portion of an inner arm of the predominantly vertical portion 322 and laterally corresponds to the support through hole 335. The locking apparatus 500 locks the side deck 700 to the bracket system 300 in each of the adjusted positions via the support through hole 335, the plurality of locking holes 739 and the support hole 325.

In at least one embodiment, the predominantly vertical portion 362 includes a pair of front attachment holes 369/369. The pair of front attachment holes 369/369 laterally correspond to each other and laterally correspond to the pair of rear attachment holes 329/329. The side deck 700 is rotatably mounted to the bracket system 300 via a rear fastening assembly 420, the rear mounting hole 729, and the pair of rear attachment holes 329/329 and via a front fastening assembly 420, the front mounting hole 769, and the pair of front attachment holes 369/369.

Figure 8:
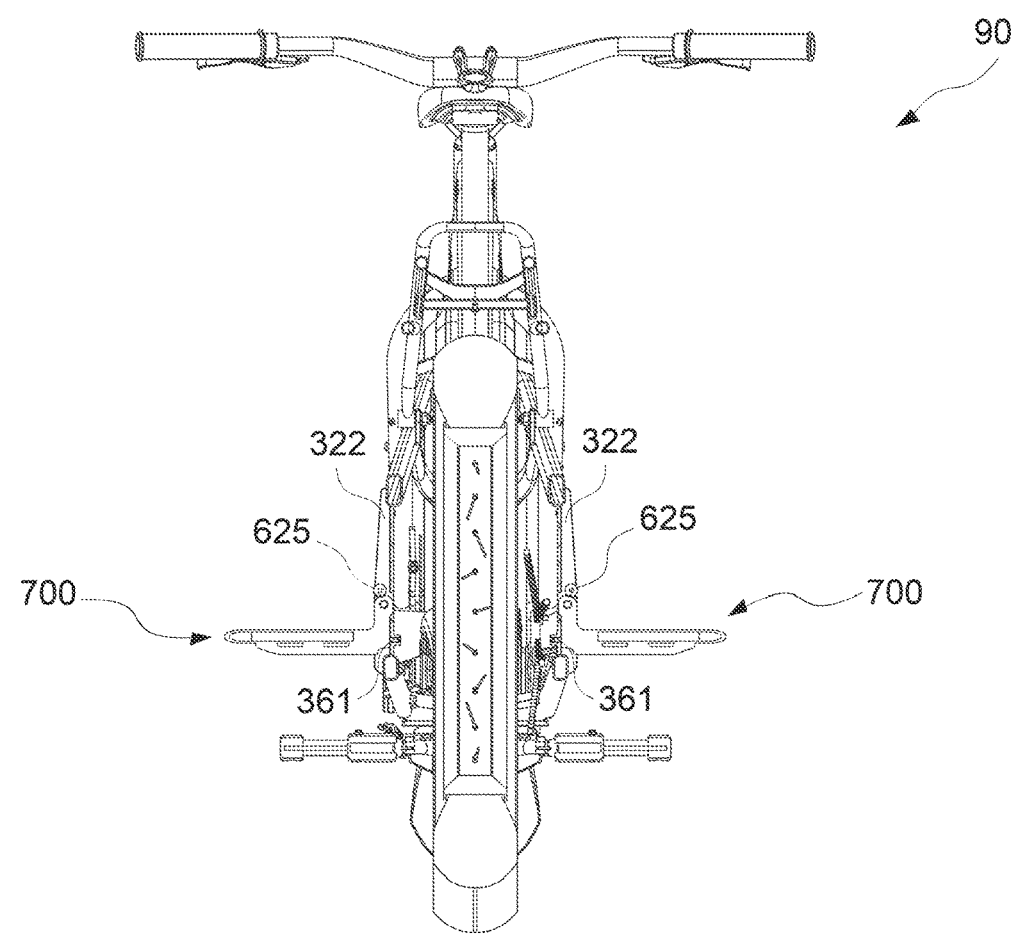
FIG. 8 is an interior view of an adjustment member of the bracket system of the multi-angle adjustable bicycle side deck of FIG. 1A according to one embodiment of the present disclosure.

FIG. 8 includes at least one embodiment of an adjustment member 361 of the predominantly vertical portion 362. At least one of the predominantly vertical portions 362 of the bracket system 300 further includes the adjustment member 361 protruding through the predominantly vertical portion 362. The adjustment member 361 abuts the at least one attachment end 765 of the side deck 700 when the side deck 700 is in the horizontal adjusted position HA.

In at least one embodiment, as an example, the adjustment member 361 is a screw that is screwed through the base of the predominantly vertical portion 362. The distance from where the screw is screwed through the base to a bottom of the predominantly vertical portion 362 is less than the distance from where the pair of front attachment holes 369/369 is disposed through the two plated arms to the bottom of the predominantly vertical portion 362.

In at least one embodiment, the adjustment member 361 is configured to provide additional support and strength at the at least one attachment end 765 of the side deck 700, which is a front of the side deck 700, when the side deck 700 is in the horizontal adjusted position HA. The adjustment member 361 assures the side deck 700 is level when carrying a passenger(s) or cargo.

Figure 9A:
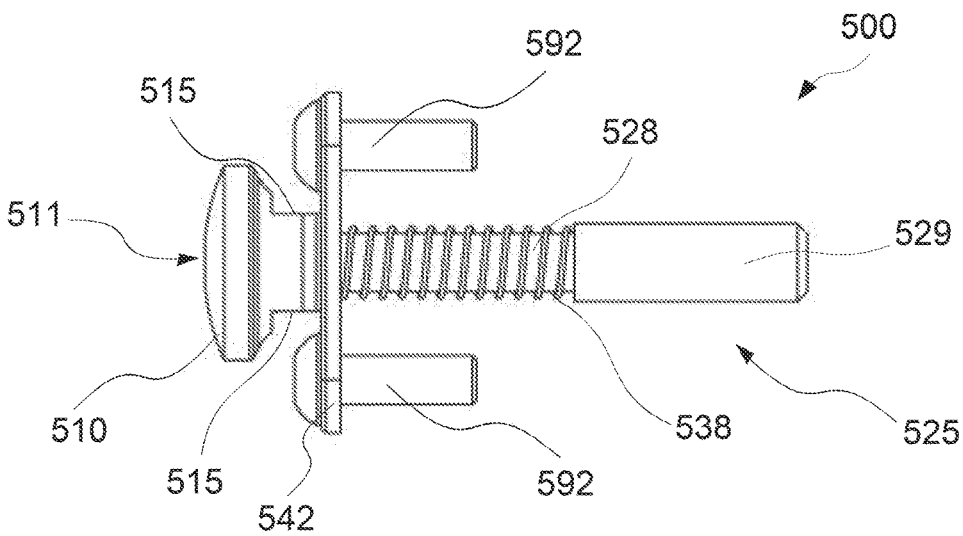
FIG. 9A is a perspective view of a locking apparatus of the multi-angle adjustable bicycle side deck of FIG. 1A according to one embodiment of the present disclosure.
Figure 9B:
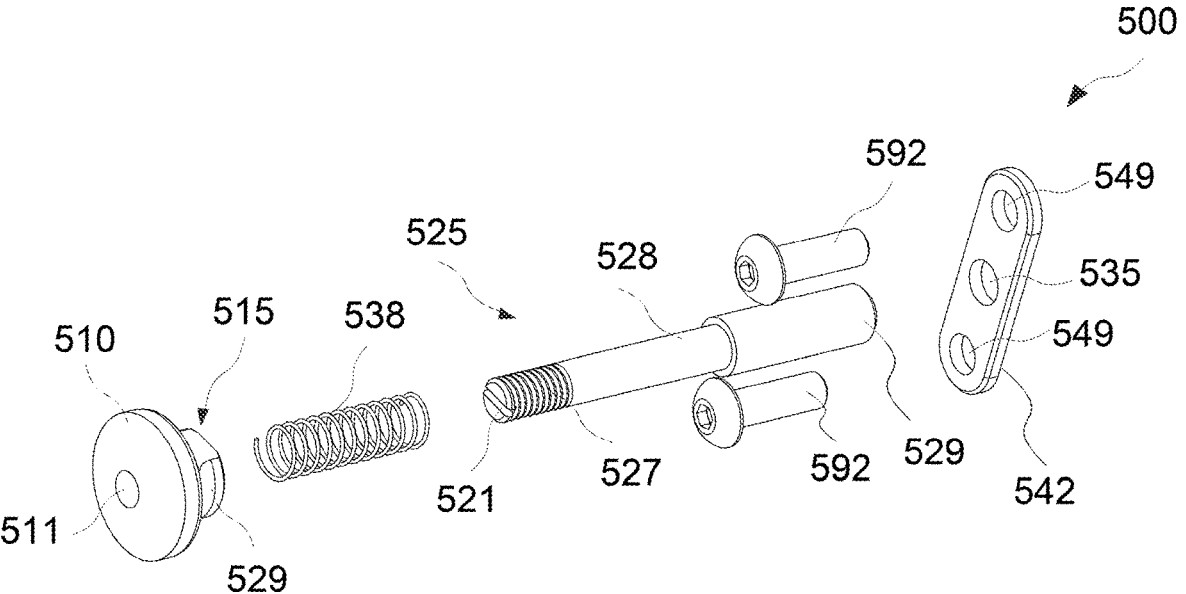
FIG. 9B is an exploded view of the locking apparatus of FIG. 9A according to one embodiment of the present disclosure.
Figure 10:
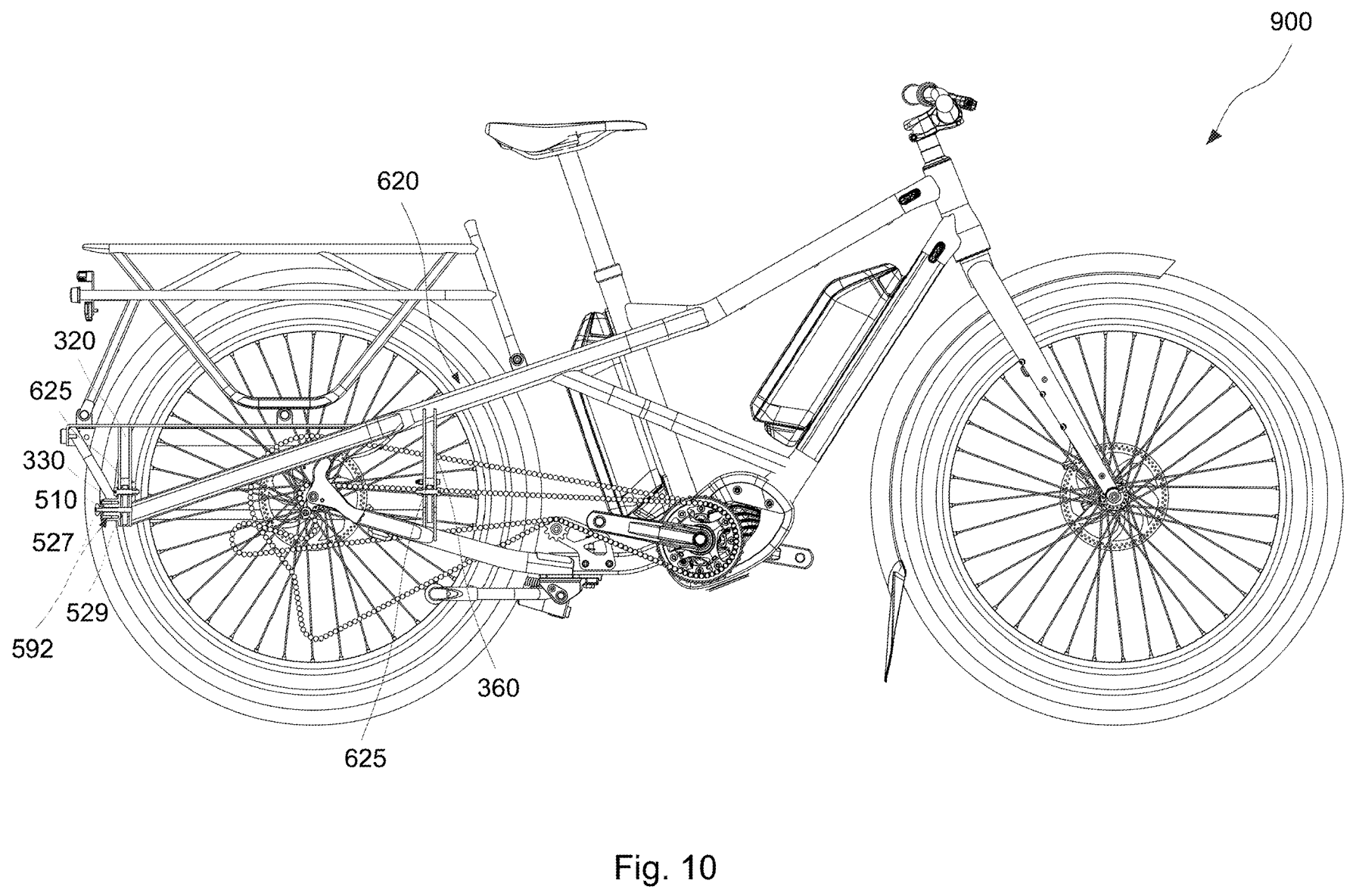

FIGS. 9A and 9B include at least one embodiment of the locking apparatus 500 and FIG. 10 includes at least one embodiment of the locking apparatus 500 in operation. In at least one embodiment, the locking apparatus 500 includes a spring quick release lock pin 525. The spring quick release lock pin 525 protrudes through the structural support housing 330 to lock the side deck 700 to the bracket system 300 via the plurality of locking holes 739.

In at least one embodiment, the locking apparatus 500 further includes a reinforcing plate 542 and a pair of fasteners 592/592. In the embodiments, as an example, a shape of the reinforcing plate 542 corresponds to the cuboid shape with opposing rounded ends of the structural support housing 330. As an example, the reinforcing plate 542 can be a flat cuboid shape with opposing rounded ends, and a top surface of the structural support housing 330, opposite the predominantly vertical portion 322, can also be a flat cuboid shape with opposing rounded ends, so that when mounted, the reinforcing plate 542 fixedly abuts the entire top surface of the structural support housing 330.

In at least one embodiment, the reinforcing plate 542 includes a central hole 535 and a pair of fastener holes 549. The central hole 535 is disposed centrally on the reinforcing plate 542, between the pair of fastener holes 549. The pair of fastener holes 549 correspond to the pair of fixing holes 332 so that the locking apparatus 500 is mounted to the structural support housing 330 via the pair of fasteners 592/592, inserted through the pair of fastener holes 549, and fixedly fastened to threads of the pair of fixing holes 332. The central hole 535 corresponds to the support through hole 335 so that the locking apparatus 500 locks the side deck 700 to the bracket system 300 in each of the adjusted positions via the spring quick release lock pin 525, inserted through the central hole 535, through the support through hole 335, through one of the plurality of locking holes 739, and through the support hole 325.

In at least one embodiment, the locking apparatus 500 further includes an augmented knob 510 having a fastening through hole 511 and nut-like neck 529, and a spring 538. The spring quick release lock pin 525 includes a reinforced locking portion 529, a shaft 528, a threaded portion 527 and an adjusting slot 521. Shapes of the reinforced locking portion 529, the shaft 528, and the threaded portion 527 can be cylindrical, and a diameter of the reinforced locking portion 529 is greater than a diameter of the shaft 528 and the threaded portion 527. The shaft 528 is connected to the reinforced locking portion 529 on one end, and at the connection, the reinforced locking portion 529 includes a shoulder ledge. The shaft 528 is connected to the threaded portion 527 on an opposite end of the reinforced locking portion 529. The adjusting slot 521 is disposed on an end of the threaded portion 527 opposite the shaft 528. The spring 538, is a compression spring, disposed surrounding the shaft 528. A shape of the augmented knob 510 can be mushroom-shaped. The fastening through hole 511 is disposed centrally through the augmented knob 510, which also runs through the nut-like neck 529. The fastening through hole 511 corresponds to the central hole 535. The nut-like neck 529 includes a threaded hole portion 517 of the fastening through hole 511. A shape of the nut-like neck 529 can be cylindrical having two opposing side flat cut outs 515.

In at least one embodiment, mounting of the locking apparatus 500 to the structural support housing 330 includes fixing of the reinforcing plate 542 to the structural support housing 330 via the pair of fasteners 592/592. This may include disposing of the spring 538 around the shaft 528 to abut the shoulder ledge, and inserting the spring quick release lock pin 525 through the central hole 535, through the support through hole 335, through one of the plurality of locking holes 739, and through the support hole 325. The augmented knob 510 may be fastened to the spring quick release lock pin 525 via the threaded portion 527 being screwed to the threaded hole portion 517. The threaded portion 527 may be screwed to the threaded hole portion 517 by, as an example, inserting a flat head screwdriver completely through the fastening through hole 335 into the adjusting slot 521 on the end of the threaded portion 527. Next, a wrench, as an example, is secured to the two opposing side flat cut outs 515 to prevent the augmented knob 510 from rotating and the flat head screwdriver is turned to screw the threaded portion 527 to the threaded hole portion 517. A final length of the shaft 528 and reinforced locking portion 529 is adjusted so that an end opposite the shoulder ledge protrudes through the support hole 325 by adjusting an insertion portion of the threaded portion 529 into the threaded hole portion 517.

During the adjusting and locking operation, in at least one embodiment, the augmented knob 510 can be easily pulled so that the spring 538 can be compressed and the reinforced locking portion 529 can be de-inserted from the plurality of locking holes 739 and the support hole 325. The side deck 700 can then be rotated to the appropriate plurality of locking holes 739 corresponding to the vertical adjusted position VA, horizontal adjusted position HA, or zero or more additional adjusted positions FAA/SAA/TAA, and then be released to once again lock the side deck 700 to the bracket system 300. When the spring 538 is compressed, an end of the spring 538 abuts the shoulder ledge of the reinforced locking portion 529 and an opposite end of the spring abuts an inner side of the reinforcing plate 542 opposite the augmented knob 510.

In at least one embodiment, when the locking apparatus 500 is in a locking position, an axial force of the spring 538 is continually applied to the inner side of the reinforcing plate 542. Thus, a securing force is continually applied to a bottom of the nut-like neck 529 of the augmented knob 510 via an outer side of the reinforcing plate 542 opposite the spring 538 so that the augmented knob 510 is prevented from unscrewing from the spring quick release lock pin 525. In at least one embodiment, the fastening through hole 511 can have at least one slit (not shown) opposite the threaded hole portion 517 and a plug (not shown) can be inserted into the fastening through hole 511 and the at least one slit, and into the adjusting slot 521 tightly or fixedly. As the plug is inserted into the at least one slit of the augmented knob 510 and also inserted into the adjusting slot 521, the plug is prevented from rotating without rotating the spring quick release lock pin 525, thus, preventing the augmented knob 510 from unscrewing from the spring quick release lock pin 525.

In at least one embodiment, when the side deck 700 is locked to the bracket system 300, an outer surface of the reinforced locking portion 529 abuts an end portion of the support through hole 335 and the outer arm of the predominantly vertical portion 322, completely through one of the plurality of locking holes 739, and completely through the support hole 325 for increasing and enhancing a strength of the rotatable assembly of the side deck 700 to the bracket system 300. The structural support housing 330 further includes a thickness, whereby the support through hole 335 includes a length. The shoulder ledge of the reinforced locking portion 529 is within an end portion of the support through hole 335 and the end opposite the shoulder ledge protrudes through the support hole 325 so that there is no play of the spring quick release lock pin 525 when being adjusted and when in the locking position.

More particularly, but not exclusively, a strength and maximum bending stiffness, load-bearing capacity, and flexural rigidity of the rotatably assembly of the side deck 700 to the bracket system 300 are increased as the reinforced locking portion 529 is locked through two plated arms of the flat U-shape of the predominantly vertical portions 322 versus locking through only one plate. Additionally, one of the two plated arms of the flat U-shape of the predominantly vertical portions 322 is further strengthened by integral formation, on the outer lower portion of the predominantly vertical portion 322, of the support through hole 335 of the structural support housing 330, and the shoulder ledge of the reinforced locking portion 529 operating within the end portion of the support through hole 335.

In at least one embodiment, the locking apparatus 500 is mounted to the structural support housing 330 and the spring quick release lock pin 525, the spring 538, the reinforcing plate 542, the augmented knob 510, and the pair of fasteners 592/592 can be replaced with a same or similar parts for convenience of maintenance and replacement.

In at least one embodiment, the locking apparatus is integrally formed with the structural support housing 300, whereby the reinforcing plate 542 is fixed to the structural support housing 330 and the pair of fasteners 592/592 are not required.

In at least one embodiment, the structural support housing 330 protrudes laterally from the outer lower portion of the predominantly vertical portion 322 so that access to the augmented knob 510 of the locking apparatus 500 when the locking apparatus 500 is mounted to the structural support housing 330 is convenient. A bicyclist can have unhindered access to the augmented knob 510 when the side deck 700 is rotatably mounted to the bracket system 300 and folds down from a vertical adjusted position VA to a horizontal adjusted position HA, and zero or more additional adjusted positions FAA/SAA/TAA in between, and vice versa. In at least one embodiment, the unhindered access is not affected when each of the pair of panniers 800 is supported by one multi-angle adjustable bicycle side deck 100 and the side deck 700 is rotatably folded down from a vertical adjusted position VA to a horizontal adjusted position HA, and zero or more additional adjusted positions FAA/SAA/TAA in between, and vice versa.

Figure 11:
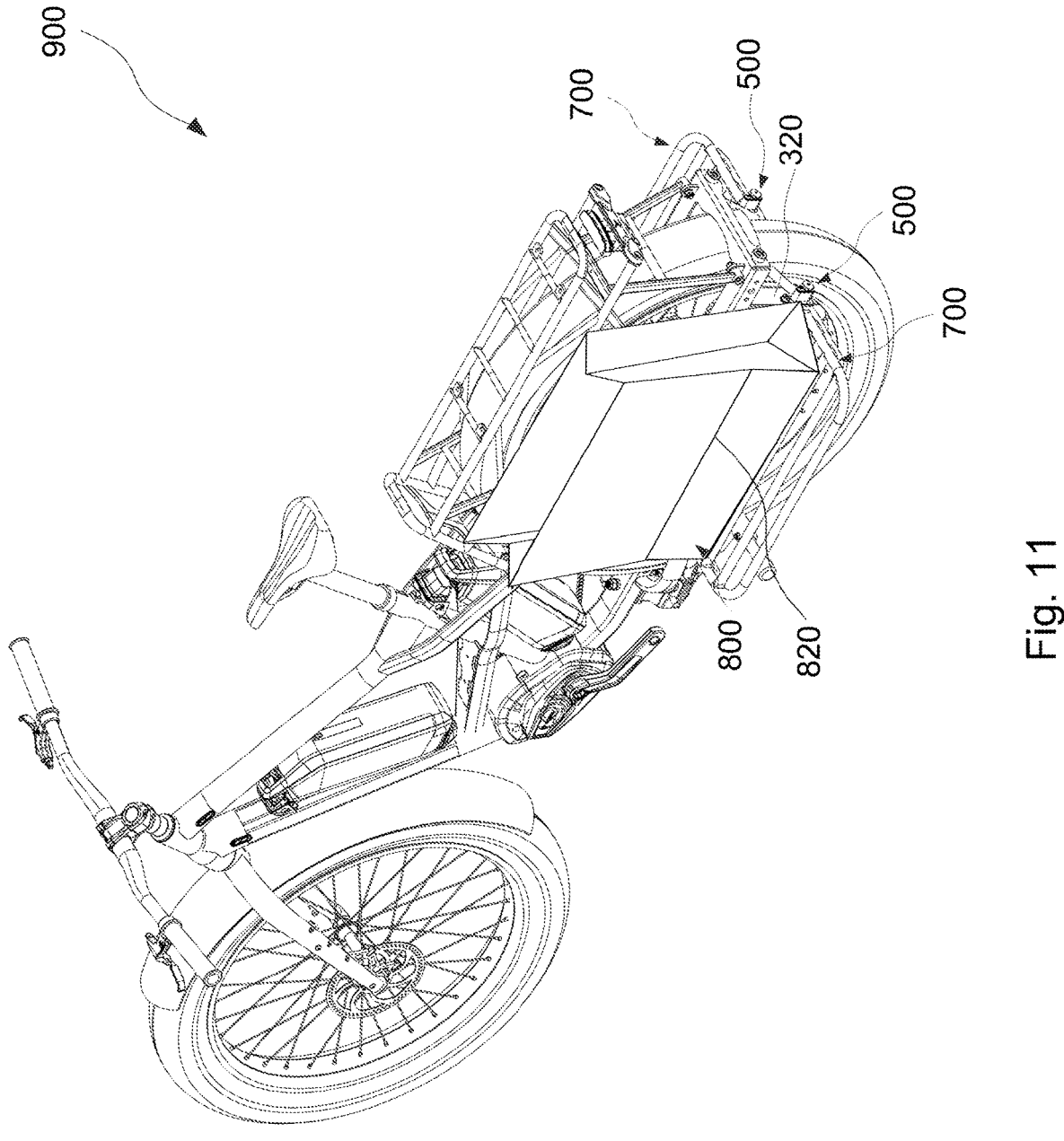
FIG. 11 is a perspective view of a pair of panniers mounted to the bicycle of FIG. 2E and the multi-angle adjustable bicycle side deck of FIG. 1A according to one embodiment of the present disclosure.

FIG. 11 includes at least one embodiment of a pair of panniers 800 mounted to the bicycle 900 and the multi-angle adjustable bicycle side deck 100 in the yet another additional adjusted position. The pair of panniers 800 is mounted on opposite sides of the bicycle 900, whereby each of the panniers is supported by one multi-angle adjustable bicycle side deck 100. Each of the panniers includes an accordion-like folding system 820, whereby when the side deck 700 is adjusted to the horizontal adjusted position HA the pannier is full expanded and when the side deck 700 is adjusted to the vertical adjusted position VA the pannier is squeezed between the bicycle 900 and the side deck 700. When each of the panniers is squeezed between the bicycle 900 and the side deck 700 a storage volume of the pannier decreases.

The terms "bicycle" and "cargo bicycle" in the present context are understood to mean any pedal, pedal-based electric assist, electric, and 2-wheeled bicycle, suitable for use in having the multi-angle adjustable bicycle side deck 100 mounted thereto.

In at least one embodiment, the bracket system 300 of the multi-angle adjustable bicycle side deck 100 is mounted to the rear side frame 920 of the bicycle 900. In at least one embodiment, the mounting of the bracket system 300 to the rear side frame 920 of the bicycle includes at least one of a screw, a weld, a rivet, a bolt, or a fastener, or any combination of the foregoing.

Figure 12A:
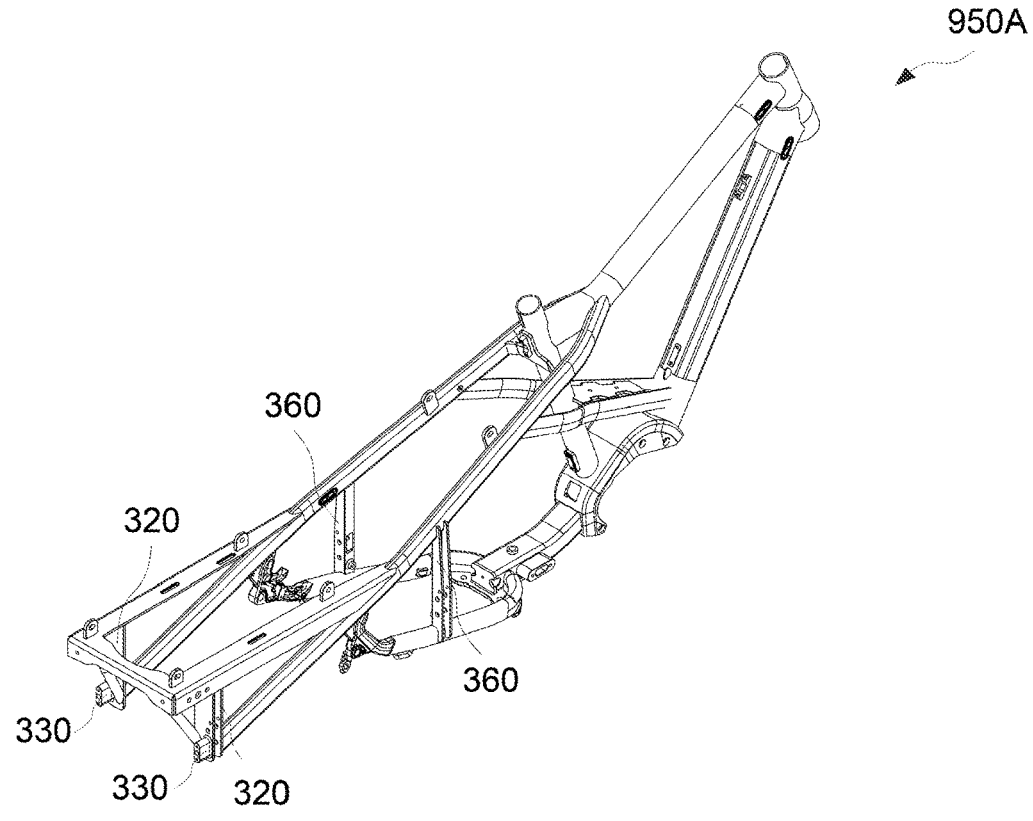
FIG. 12A is a perspective view of the two bracket systems of the multi-angle adjustable bicycle side deck of FIG. 1A mounted to rear side frames of another bicycle frame according to one embodiment of the present disclosure.
Figure 12B:
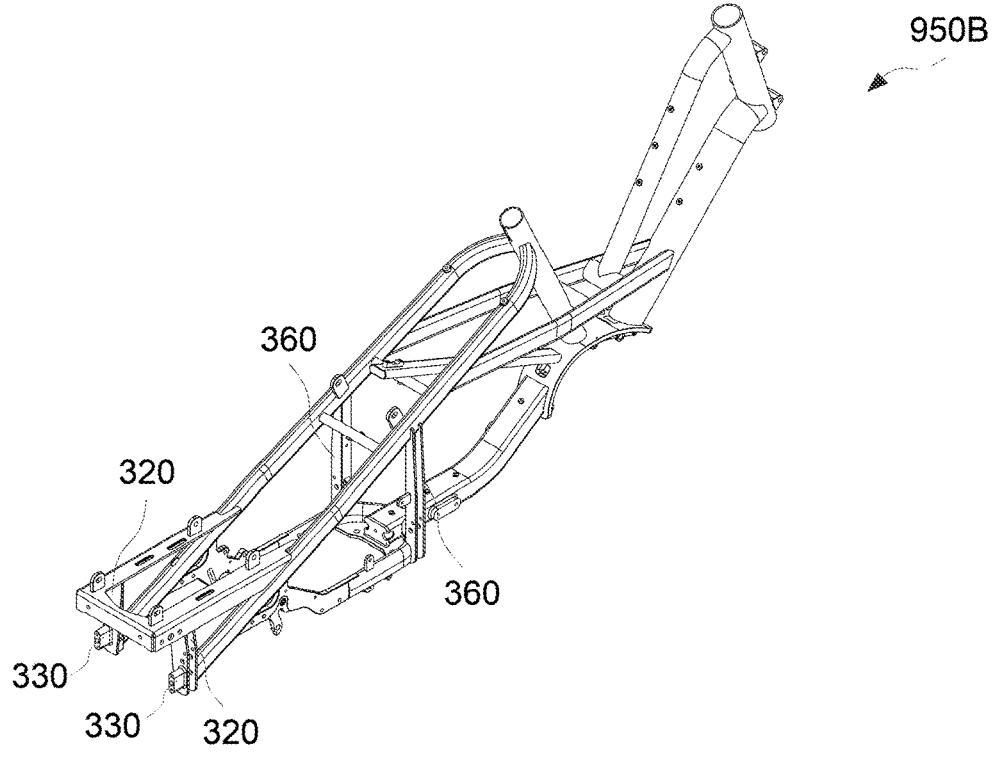
FIG. 12B is a perspective view of the two bracket systems of FIG. 12A mounted to rear side frames of yet another bicycle according to one embodiment of the present disclosure.

FIGS. 12A to 12B include at least one embodiment of the bracket system 300 mounted to rear side frames of two different types of bicycle frames, another bicycle frame 950A and yet another bicycle frame 950B. In the embodiments, different lengths of the predominantly vertical portions 322/362 of the bracket system 300 can be mounted to different types and sizes of bicycles.

In at least one embodiment, the bracket system 300 of the multi-angle adjustable bicycle side deck 100 can be integrally formed with a rear side frame 620 of further yet another bicycle 600, whereby the bicycle 600 includes the multi-angle adjustable bicycle side deck 100.

Figure 13:
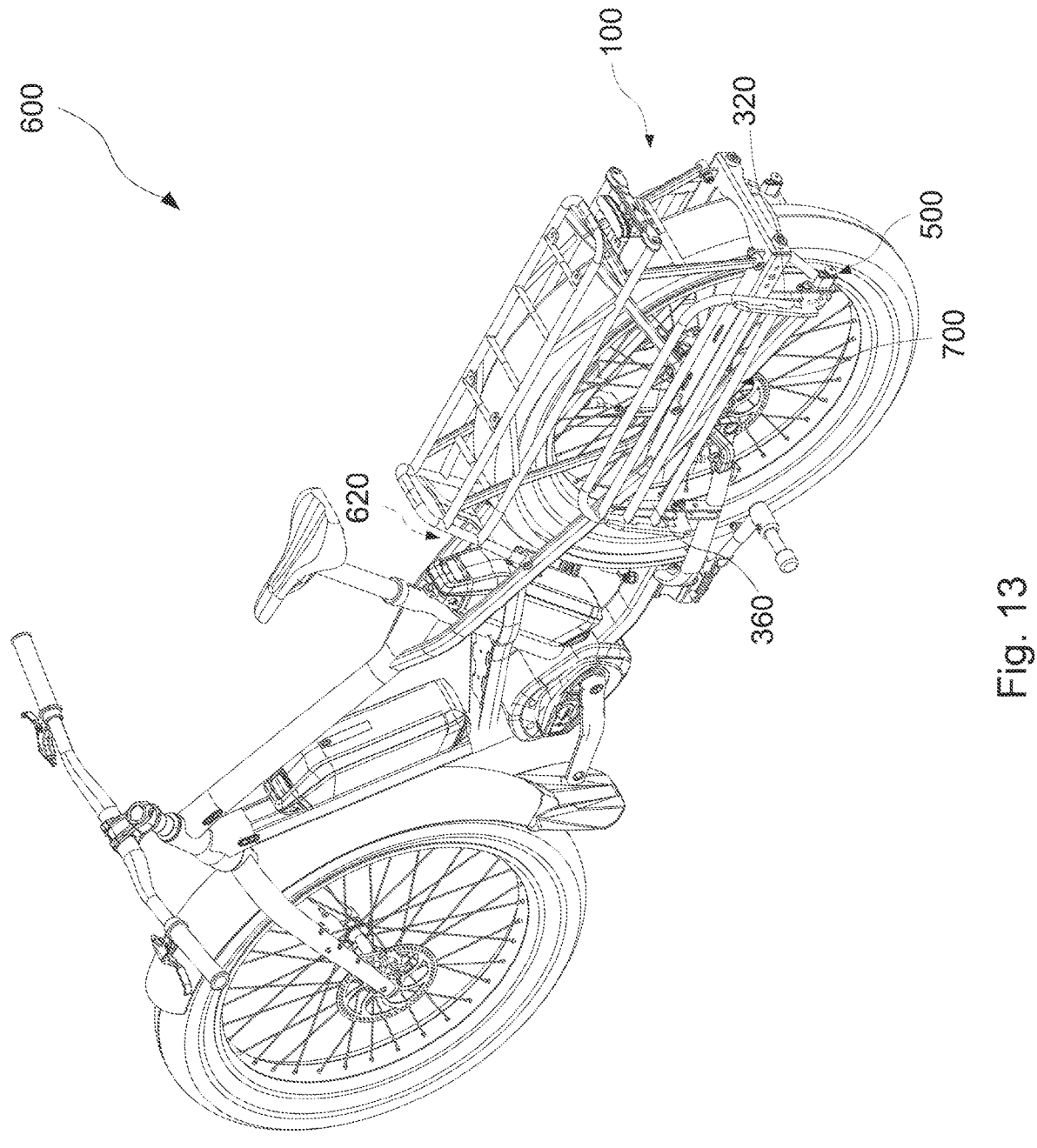
FIG. 13 is a perspective view of the multi-angle adjustable bicycle side deck of FIG. 1A mounted to a rear side frame of further yet another bicycle according to one embodiment of the present disclosure.

FIG. 13 includes at least one embodiment of multi-angle adjustable bicycle side deck 100 mounted to the rear side frame 620 of the further yet another bicycle 600. The multi-angle adjustable bicycle side deck 100 of the further yet another bicycle 600 of FIG. 13 is the same as the multi-angle adjustable bicycle side deck 100 of FIG. 1A, and therefore may be best understood with reference thereto where like numerals designate like components. The multi-angle adjustable bicycle side deck 100 of FIG. 13 includes the bracket system 300, the side deck 700, and the locking apparatus 500. The bracket system 300 is configured for mounting to the rear side frame 620 of the bicycle 600. The side deck 700 is rotatably mounted to the bracket system 300, whereby the side deck 700 folds down from the vertical adjusted position VA to the horizontal adjusted position HA, and zero or more additional adjusted positions FAA/SAA/TAA in between the vertical and horizontal adjusted positions VA/HA. Width loads of the side deck 700 get progressively larger as the side deck 700 is moved from the vertical to the horizontal adjusted positions VA/HA. The locking apparatus 500 locks the side deck 700 to the bracket system 300 in each of the adjusted positions, including the vertical and horizontal adjusted position VA/HA. Each width load is defined by a plane of the rear side frame 620 of the bicycle to a relative plane defined by a flat longitudinal plane of the side deck 700.

Innovative principles previously described in relation to the multi-angle adjustable bicycle side decks 100, including specific arrangements and examples of bracket systems 300, and the side decks 700, and more particularly, but not exclusively, innovative principles described in relation to the structural support housings 330 and locking apparatuses 500 are not described again in detail for the further yet another bicycle 600 including the multi-angle adjustable bicycle side deck 100 of FIG. 1A for purposes of succinctness and clarity.

FIGS. 8 and 10 include at least one embodiment of a pair of rubber dampers 625 of the bicycle 900. The pair of rubber dampers 625 is mounted to the predominantly vertical portions 322/362 of the bracket system 300. When the side deck 700 is in the vertical adjusted position VA, the side deck 700 abuts the pair of rubber dampers 625 so that the side deck 700 does not rattle against the rear side frame 620 of the further yet another bicycle 600.

In at least one embodiment, the further yet another bicycle 600 further comprises at least one fastening member 729. The at least one fastening member 729 can be used to enhance securing of cargo during transportation. As an example, the at least one fastening member 729 can be used to enhance securing of the pair of panniers 800 to the rear side frame 920 of the bicycle 900 and the multi-angle adjustable bicycle side deck 100, respectively. In at least one embodiment, the main deck 750 includes at least one fastening portion (not shown) disposed at the two same side rounded corners of the main deck 750. The at least one fastening portion is configured to prevent the at least one fastening member 729 from laterally sliding when attached to the main deck 750 and supporting the securing of cargo.

The present disclosure provides the multi-angle adjustable bicycle side deck 100 including the bracket system 300, the side deck 700, and the locking apparatus 500. The multi-angle adjustable bicycle side deck 100 adjusts a width load of the bicycle 900 and locks the side deck 700 in place at different adjusted positions having different angles. Thus, when the maximum width load of the bicycle 900 is less than the maximum width load of the side deck 700 in the horizontal adjusted position HA, cargo can be securely transported without the use of ropes, straps or fasteners. Furthermore, as the angle of the adjusted positions decrease so does the maximum width of the bicycle 900. Thus, a bicyclist of the bicycle 900 can decrease the maximum width of the bicycle 900 while still securely transporting cargo, so that riding in traffic and between narrower spaces is safer and easier. In addition, when cargo is secured between and by the bracket system 300, the locking apparatus 500, and the side deck 700, the cargo load is distributed more centrally toward the center of the bicycle 900 so that the bicycle 900 is more balanced and easier to control, making transportation safer.

Furthermore, strength of the attachment ends of the side deck 100 to the bracket system 300 may be enhanced and improved by the rear L-shaped support bracket 720 and the front L-shaped support bracket 720 of the side deck 700. The rear L-shaped support bracket 720 and the front L-shaped support bracket 720 are disposed below and adjacent to respective rectangular corners of the main deck 750 of the side deck 700 on edges of the rear L-shaped support bracket 720 and the front L-shaped support bracket 720, strengthening and supporting the main deck 750. Thus, bending stiffness, load-bearing capacity, and flexural rigidity at the rear L-shaped support bracket 720 and the front L-shaped support bracket 720, more particularly, but not exclusively, bending stiffness, load-bearing capacity, and flexural rigidity when cargo is carried and the side deck 700 is not in the horizontal adjusted position HA are increased, increasing the maximum load that can be carried by the multi-angle adjustable bicycle side deck 100.

Yet furthermore, strength of the locking apparatus 500 locking the side deck 700 to the bracket system 300 may be enhanced and improved by the flat U-shape of the predominantly vertical portions 322/362 of the bracket system 300, the structural support housing 330 of one of the predominantly vertical portions 322, and the reinforced locking portion 529 of the spring quick release lock pin 525 of the locking apparatus 500. The reinforced locking portion 529 is locked through two plated arms of the flat U-shape of the predominantly vertical portions 322 versus locking through only one plate, increasing locking strength. the rear attachment end 725 of the rear L-shaped support bracket 720 and the front attachment end 765 of the front L-shaped support bracket 720 are mounted between the predominantly vertical portions 322/362, respectively, versus mounting to only one plate each, increasing mounting strength. Additionally, the structural support housing 330 may be integrally formed on an outer lower portion of the predominantly vertical portion 322 so that the shoulder ledge of the reinforced locking portion 529 operates within an end portion of the support through hole 335 of the structural support housing 330 and through the predominantly vertical portions 322, providing further support and strength. Thus, bending stiffness, load-bearing capacity, and flexural rigidity at the rear attachment end 725 and front attachment end 765 mounted to the reinforced locking portion 529 are increased, further increasing the maximum load that can be carried by the multi-angle adjustable bicycle side deck 100.

Even yet furthermore, access to an augmented knob 510 of the locking apparatus 500 when the locking apparatus 500 is mounted to the structural support housing 330 is convenient, as the structural support housing 330 protrudes laterally from the outer lower portion of the predominantly vertical portion 322. A bicyclist has unhindered access to the augmented knob 510 when the side deck 700 is rotatably mounted to the bracket system 300 and folds down from the vertical adjusted position VA to the horizontal adjusted position HA, and zero or more additional adjusted positions FAA/SAA/TAA in between, and vice versa. Additionally, the unhindered access is not affected when each of the pair of panniers 800 is supported by one multi-angle adjustable bicycle side deck 100 and the side deck 700 is rotatably folded down from the vertical adjusted position VA to the horizontal adjusted position HA, and zero or more additional adjusted positions FAA/SAA/TAA in between, and vice versa.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A multi-angle adjustable bicycle side deck for a bicycle having a rear side frame, comprising:
   a bracket system, configured for mounting to the rear side frame of the bicycle proximate a rear wheel of the bicycle, wherein:
   the bracket system comprises a rear bracket and a front bracket,
   the rear bracket has a first predominantly vertical portion relative to a surfaced upon which the bicycle operates,
   the front bracket has a second predominately vertical portion relative to a surfaced upon which the bicycle operates,
   the first predominately vertical portion is disposed toward a rear of the rear wheel of the bicycle, the second predominately vertical portion is disposed toward a front of the rear wheel of the bicycle, the first predominately vertical portion and the second predominately vertical portion are located on a same side of the bicycle;

the first predominately vertical portion has a first length, the second predominately vertical portion has a second length, and the first length is different than the second length, a side deck, rotatably assembled to the bracket system, allowing the side deck to fold down from a vertical adjusted position, relative to the surface, to a horizontal adjusted position, relative to the surface, and zero or more additional adjusted positions in between the vertical and horizontal adjusted positions, with width loads getting progressively larger as the side deck is moved from the vertical to the horizontal adjusted positions, wherein the first predominately vertical portion is attached to the bicycle and the side deck, and the second predominately vertical portion is attached to the bicycle and the side deck; and a locking apparatus that locks the side deck to the bracket system in each of the adjusted positions, including the vertical and horizontal adjusted positions, wherein each width load is defined by a plane of the rear side frame of the bicycle and a top surface plane of the side deck.

2. The multi-angle adjustable bicycle side deck as recited in claim 1, wherein the first length is less than the second length.

3. The multi-angle adjustable bicycle side deck as recited in claim 1, wherein the first predominately vertical portion is parallel to the second predominately vertical portion.

4. The multi-angle adjustable bicycle side deck as recited in claim 1, wherein the rear bracket comprises a structural support housing protruding from a lower portion of the first predominantly vertical portion, structurally supporting the locking apparatus for locking of the side deck to the bracket system via a plurality of locking holes.

5. The multi-angle adjustable bicycle side deck as recited in claim 1, comprising a rubber damper mounted to the first predominantly vertical portion, whereby when the side deck is in the vertical adjusted position the side deck abuts the rubber damper.

6. The multi-angle adjustable bicycle side deck as recited in claim 1, wherein the side deck comprises an attachment end fastened to the bracket system using any combination of nuts, bolts, screws, rivets, or fasteners.

7. The multi-angle adjustable bicycle side deck as recited in claim 6, comprising an adjustment member protruding through the first predominantly vertical portion, the adjustment member abutting the attachment end when the side deck is in the horizontal adjusted position.

8. The multi-angle adjustable bicycle side deck as recited in claim 6, wherein the attachment end comprises a semicircular portion including a plurality of locking holes, and the locking apparatus comprises a spring quick release lock pin for locking of the side deck to the bracket system via the plurality of locking holes.

9. The multi-angle adjustable bicycle side deck as recited in claim 1, wherein the side deck is removable and replaceable by alternate side decks of different dimensions, whereby each side deck is interchangeably rotatably assembled to the bracket system.

10. The multi-angle adjustable bicycle side deck as recited in claim 1, comprising at least one of a screw, a weld, a rivet, a bolt, or a fastener, or any combination of the foregoing for mounting of the bracket system to the rear side frame of the bicycle.

11. The multi-angle adjustable bicycle side deck as recited in claim 1, wherein the side deck is made of at least one of tubes, sheet metal, plates, or any combination of the foregoing.

12. The multi-angle adjustable bicycle side deck as recited in claim 1, wherein the side deck is limited to only a range of adjusted positions within a 90-degree arc between the vertical adjusted position and the horizontal adjusted position.

13. A multi-angle adjustable bicycle side deck, comprising:

a bracket system, configured for mounting to a rear side frame of a bicycle;

a side deck, rotatably assembled to the bracket system, allowing the side deck to fold down from a vertical adjusted position to a horizontal adjusted position, and zero or more additional adjusted positions in between the vertical and horizontal adjusted positions, with width loads getting progressively larger as the side deck is moved from the vertical to the horizontal adjusted positions; and a locking apparatus that locks the side deck to the bracket system in each of the adjusted positions, including the vertical and horizontal adjusted positions, wherein each width load is defined by a plane of the rear side frame of the bicycle and a top surface plane of the side deck, and wherein a pair of panniers is mounted on opposite sides of the bicycle, each of the pair of panniers supported by one multi-angle adjustable bicycle side deck, each of the pair of panniers comprising an accordion-like folding system, whereby when the side deck is adjusted to the horizontal adjusted position the pannier is full expanded and when the side deck is adjusted to the vertical adjusted position, the pannier is squeezed between the bicycle and the side deck, decreasing its storage volume.

14. A bicycle, comprising:

a rear side frame; and a multi-angle adjustable bicycle side deck comprising:

a bracket system, configured for mounting to the rear side frame of the bicycle proximate a rear wheel of the bicycle, wherein:

the bracket system comprises a rear bracket and a front bracket, the rear bracket has a first predominantly vertical portion relative to a surfaced upon which the bicycle operates, the front bracket has a second predominately vertical portion relative to a surfaced upon which the bicycle operates, the first predominately vertical portion is disposed toward a rear of the rear wheel of the bicycle, the second predominately vertical portion is disposed toward a front of the rear wheel of the bicycle, the first predominately vertical portion and the second predominately vertical portion are located on a same side of the bicycle;

the first predominately vertical portion has a first length, the second predominately vertical portion has a second length, and the first length is different than the second length, a side deck, rotatably assembled to the bracket system, allowing the side deck to fold down from a vertical adjusted position, relative to the surface, to a horizontal adjusted position, relative to the surface, and zero or more additional adjusted positions in between the vertical and horizontal adjusted positions, with width loads getting progressively larger as the side deck is moved from the vertical to the horizontal adjusted positions, wherein the first predominately vertical portion is attached to the bicycle and the side deck, and the second predominately vertical portion is attached to the bicycle and the side deck, and a locking apparatus that locks the side deck to the bracket system in each of the adjusted positions, including the vertical and horizontal positions, wherein each width load is defined by a plane of the rear side frame of the bicycle and a top surface plane of the side deck.

15. The bicycle as recited in claim 14, wherein the first length is less than the second length.

16. The bicycle as recited in claim 14, wherein the rear bracket comprises a structural support housing protruding from a lower portion of the first predominantly vertical portion, structurally supporting the locking apparatus for locking of the side deck to the bracket system via a plurality of locking holes.

17. The bicycle as recited in claim 14, comprising a rubber damper mounted to the first predominantly vertical portion, whereby when the side deck is in the vertical adjusted position the side deck abuts the rubber damper.

18. The bicycle as recited in claim 14, wherein the bracket system is integrally formed with the rear side frame.

19. The bicycle as recited in claim 14, wherein the side deck comprises an attachment end fastened to the bracket system using a least one of a nut, a bolt, a screw, a rivet, or a fastener.

20. The bicycle as recited in claim 14, wherein a pair of panniers is mounted on opposite sides of the bicycle, each of the pair of panniers supported by one multi-angle adjustable bicycle side deck, each of the pair of panniers comprising an accordion-like folding system, whereby when the side deck is adjusted to the horizontal adjusted position the pannier is full expanded and when the side deck is adjusted to the vertical adjusted position, the pannier is squeezed between the bicycle and the side deck, decreasing its storage volume.

* * * * *